(12) United States Patent
Grant

(10) Patent No.: US 11,387,995 B2
(45) Date of Patent: Jul. 12, 2022

(54) APPARATUS AND METHOD FOR ALIGNING CORRESPONDING ELEMENTS IN MULTIPLE STREAMS OF ELEMENTS

(71) Applicant: ARM LIMITED, Cambridge (GB)

(72) Inventor: Alasdair Grant, Cambridge (GB)

(73) Assignee: Arm Limited, Cambridge (GB)

( * ) Notice: Subject to any disclaimer, the term of this patent is extended or adjusted under 35 U.S.C. 154(b) by 99 days.

(21) Appl. No.: 16/772,311

(22) PCT Filed: Dec. 19, 2018

(86) PCT No.: PCT/GB2018/053679
§ 371 (c)(1),
(2) Date: Jun. 12, 2020

(87) PCT Pub. No.: WO2019/150062
PCT Pub. Date: Aug. 8, 2019

(65) Prior Publication Data
US 2021/0083869 A1    Mar. 18, 2021

(30) Foreign Application Priority Data

Jan. 30, 2018  (GB) .................................... 1801494

(51) Int. Cl.
*H04L 29/06*  (2006.01)
*H04L 9/08*  (2006.01)
(Continued)

(52) U.S. Cl.
CPC ............ *H04L 9/0869* (2013.01); *G06F 7/582* (2013.01); *G06F 11/3636* (2013.01); *H04L 9/3236* (2013.01)

(58) Field of Classification Search
CPC ..... H04L 9/0869; H04L 9/3236; G06F 7/582; G06F 11/3636
(Continued)

(56) References Cited

U.S. PATENT DOCUMENTS

2004/0117770 A1  6/2004  Swoboda et al.
2011/0314340 A1  12/2011  Gilkerson et al.
(Continued)

FOREIGN PATENT DOCUMENTS

WO  2018/066661  4/2018

OTHER PUBLICATIONS

Combined Search and Examination Report for GB Application No. 1801494.4 dated Jul. 13, 2018, 6 pages.
(Continued)

*Primary Examiner* — Evans Desrosiers
(74) *Attorney, Agent, or Firm* — Nixon & Vanderhye P.C.

(57) ABSTRACT

An apparatus and method are described for aligning corresponding elements in multiple streams of elements. An apparatus is provided comprising both first generation circuitry to generate a first stream comprising first elements and second generation circuitry to generate a second stream comprising second elements. The first generation circuitry is arranged to insert a first element in the first stream to identify each occurrence of a corresponding second element in the second stream. Key generation circuitry is used to generate, for each instance of the first element to be included within the first stream, an associated key value determined from a set of key values, the set of key values being insufficient to allow unique key values to be generated for each instance of the first element. The first generation circuitry is then arranged to indicate within the first stream the associated key value for each instance of the first element. By such an approach, subsequent analysis of a sequence of key values associated with a corresponding sequence of instances of the first element within the first stream enables alignment between a first element in the first stream and its corresponding second element in the second stream. This provides a very efficient mechanism for allowing alignment
(Continued)

between individual elements in the first stream and corresponding individual elements in the second stream to be achieved, in a manner that alleviates bandwidth constraints in relation to the first stream.

19 Claims, 8 Drawing Sheets

(51) Int. Cl.
    *G06F 7/58*     (2006.01)
    *G06F 11/36*     (2006.01)
    *H04L 9/32*     (2006.01)

(58) Field of Classification Search
    USPC .......................................................... 713/171
    See application file for complete search history.

(56) References Cited

U.S. PATENT DOCUMENTS

| | | | |
|---|---|---|---|
| 2014/0229771 A1* | 8/2014 | Horley | G06F 11/079 714/45 |
| 2014/0304810 A1* | 10/2014 | Khanal | H04L 63/1466 726/22 |
| 2017/0161166 A1 | 6/2017 | Shivaprasad et al. | |

OTHER PUBLICATIONS

International Search Report and Written Opinion of the ISA for PCT/GB2018/053679 dated Mar. 14, 2019, 12 pages.

* cited by examiner

EXAMPLE 1

MONITOR SEQUENCE OF 8 KEY VALUES
KEY VALUE = 0 OR 1 (i.e. b = 2)
PERIODICITY $p = 2^8 - 1 = 255$

EXAMPLE 2

MONITOR SEQUENCE OF 3 KEY VALUES
KEY VALUE = 1, 2 OR 3 (i.e. b = 3) [e.g. 01, 10 OR 11]
PERIODICITY $p = 3^3 - 1 = 26$
EXAMPLE 26-BIT FIXED SEQUENCE OF KEY VALUES =
23213133112333231212211322

BITS [1:0] USED FOR SIGNALLING SAMPLING EVENT

01 = SAMPLING EVENT, KEY VALUE = 1
10 = SAMPLING EVENT, KEY VALUE = 2
11 = SAMPLING EVENT, KEY VALUE = 3

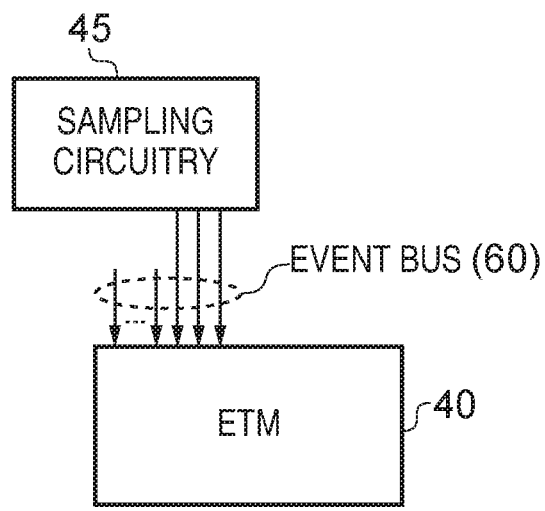

BITS [2:0] USED FOR SIGNALLING SAMPLING EVENT

001 = SAMPLING EVENT, KEY VALUE = 1
010 = SAMPLING EVENT, KEY VALUE = 2
011 = SAMPLING EVENT, KEY VALUE = 3
100 = SAMPLING EVENT, KEY VALUE = 4
101 = SAMPLING EVENT, KEY VALUE = 5
110 = SAMPLING EVENT, KEY VALUE = 6
111 = SAMPLING EVENT, KEY VALUE = 7

IF EXCLUDE THIS OPTION CAN HAVE CONFIGURABILITY
TO USE 3 BITS WITH SIX POSSIBLE KEY VALUES OR
2 BITS WITH THREE POSSIBLE KEY VALUES

FIG. 5B

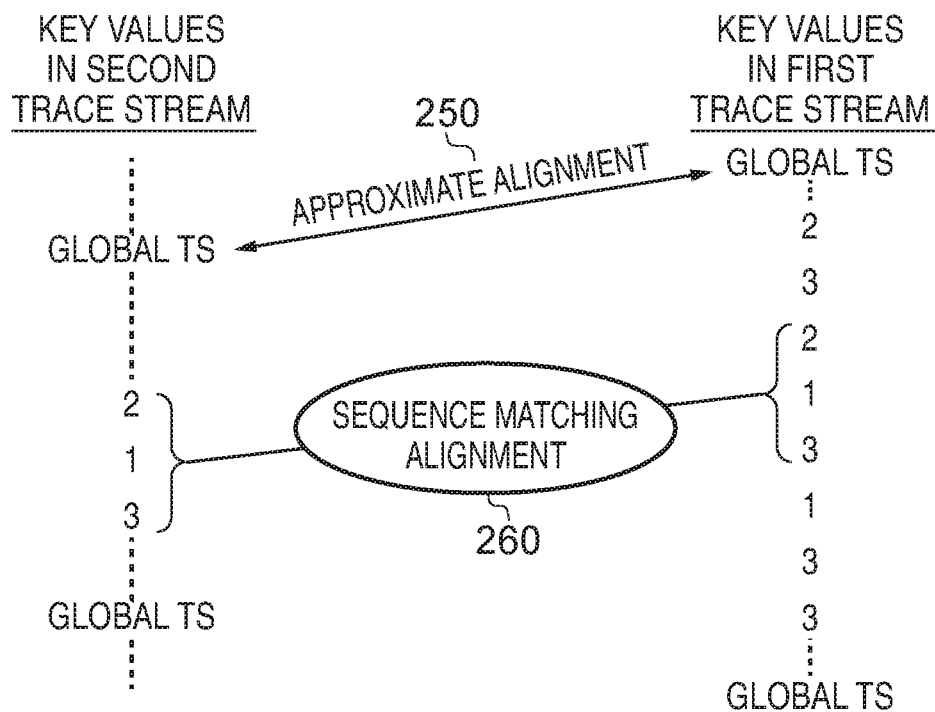
FIG. 6A (USING SERIES OF KEY VALUES WITH PERIODICITY PROPERTY)
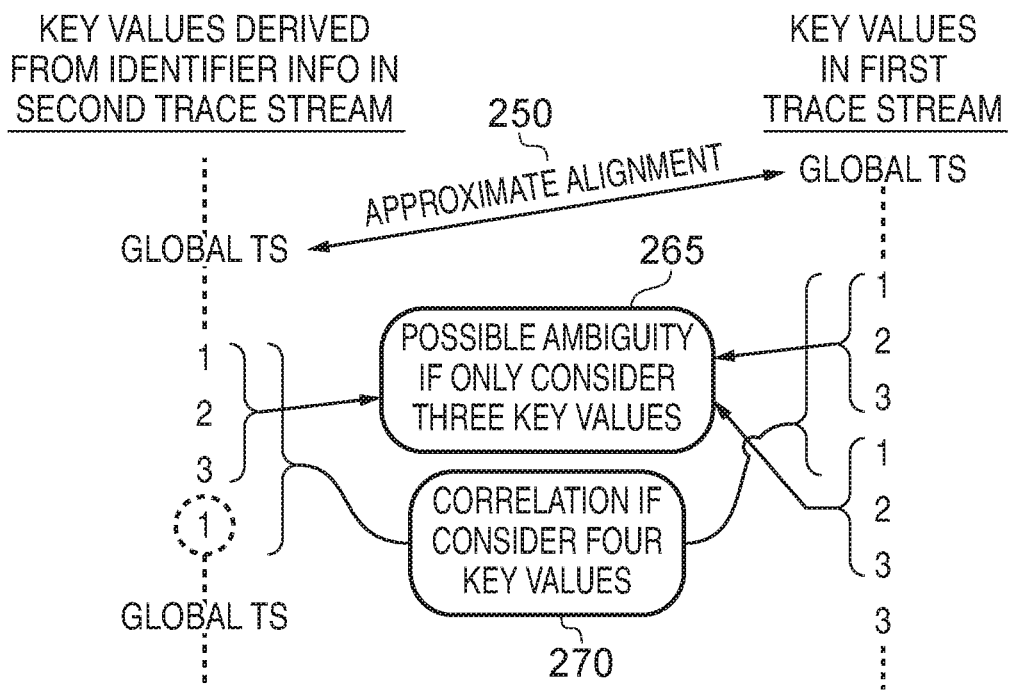
FIG. 6B (USING GENERAL PSEUDO RANDOM SERIES OF KEY VALUES)

APPARATUS AND METHOD FOR ALIGNING CORRESPONDING ELEMENTS IN MULTIPLE STREAMS OF ELEMENTS

This application is the U.S. national phase of International Application No. PCT/GB2018/053679 filed Dec. 19, 2018 which designated the U.S. and claims priority to GB Patent Application No. 1801494.4 filed Jan. 30, 2018, the entire contents of each of which are hereby incorporated by reference.

The present technique relates to an apparatus and method for aligning corresponding elements in multiple streams of elements.

In data processing systems, there are situations where multiple streams of information may be produced for later analysis, the blocks of information within those streams being referred to herein as elements. Whilst the separate streams may capture different information, they may essentially originate from the same source, and hence some of the elements within one stream may relate to the same activity at the source that caused a corresponding element to be included in the other stream.

As an example, there are a number of occasions where it is desirable to keep track of the processing activities being performed by processing elements such as a central processing unit (CPU). For example, such information is useful during the development of a data processing apparatus. An example of a tool that may be used to assist in such a process is a tracing tool.

Tracing the activity of a processing element whereby a trace stream is generated that includes data representing the step-by-step activity within the system is a highly useful tool in system development. Such tracing tools use a variety of means for tracing the program flow including embedded trace macrocells (ETM, a trademark of Arm Limited, Cambridge) which are present on the chip whose processing is being monitored.

In some instances, multiple separate trace streams may be produced, where within those multiple streams some of the elements in one stream relate to the same activities as captured by corresponding elements in the other stream, and accordingly when analysing the multiple trace streams it would be useful to be able to determine which elements in one stream correspond to which elements in the other stream.

In one example arrangement, there is provided an apparatus comprising: first generation circuitry to generate a first stream comprising first elements; second generation circuitry to generate a second stream comprising second elements; the first generation circuitry being arranged to insert a first element in the first stream to identify each occurrence of a corresponding second element in the second stream; key generation circuitry to generate, for each instance of the first element to be included within the first stream, an associated key value determined from a set of key values, where the set of key values is insufficient to allow unique key values to be generated for each instance of the first element; wherein the first generation circuitry is arranged to indicate within the first stream the associated key value for each instance of the first element, such that subsequent analysis of a sequence of key values associated with a corresponding sequence of instances of the first element within the first stream enables alignment between a first element in the first stream and its corresponding second element in the second stream.

In another example arrangement, there is provided a diagnostic apparatus comprising: a first interface to receive a first stream of elements; a second interface to receive a second stream of elements; and analysis circuitry to perform an alignment operation in respect of the first and second streams; the first stream containing a first element to identify each occurrence of a corresponding second element in the second stream, and providing in association with each instance of the first element an associated key value determined from a set of key values, where the set of key values is insufficient to allow unique key values to be generated for each instance of the first element; and wherein the analysis circuitry is arranged to analyse a sequence of key values associated with a corresponding sequence of instances of the first element within the first stream in order to determine alignment between a first element in the first stream and its corresponding second element in the second stream.

In a yet further example arrangement, there is provided a method of operating an apparatus to generate multiple streams of elements, comprising: generating a first stream comprising first elements; generating a second stream comprising second elements; during generation of the first stream, inserting a first element in the first stream to identify each occurrence of a corresponding second element in the second stream; generating, for each instance of the first element to be included within the first stream, an associated key value determined from a set of key values, where the set of key values is insufficient to allow unique key values to be generated for each instance of the first element; and indicating within the first stream the associated key value for each instance of the first element, such that subsequent analysis of a sequence of key values associated with a corresponding sequence of instances of the first element within the first stream enables alignment between a first element in the first stream and its corresponding second element in the second stream.

In a still further example arrangement, there is provided a method of operating a diagnostic apparatus to analyse multiple streams, comprising: receiving a first stream of elements; receiving a second stream of elements; and performing an alignment operation in respect of the first and second streams; the first stream containing a first element to identify each occurrence of a corresponding second element in the second stream, and providing in association with each instance of the first element an associated key value determined from a set of key values, where the set of key values is insufficient to allow unique key values to be generated for each instance of the first element; and during said alignment operation, analysing a sequence of key values associated with a corresponding sequence of instances of the first element within the first stream in order to determine alignment between a first element in the first stream and its corresponding second element in the second stream.

The present technique will be described further, by way of illustration only, with reference to examples thereof as illustrated in the accompanying drawings, in which:

FIG. 1 is a block diagram of a system in accordance with one example arrangement;

FIG. 2 schematically illustrates a diagnostic apparatus that can be used to analyse the two trace streams produced by the system of FIG. 1 in accordance with one example arrangement;

FIGS. 3A and 3B schematically illustrate two different mechanisms that may be used for generating the key values used within one or both streams in accordance with example arrangements;

FIGS. 5A and 5B illustrate two ways in which multiple bits of an event bus can be used to signal both sampling events and key values from the sampling unit to the ETM of FIG. 1;

Figure 2:
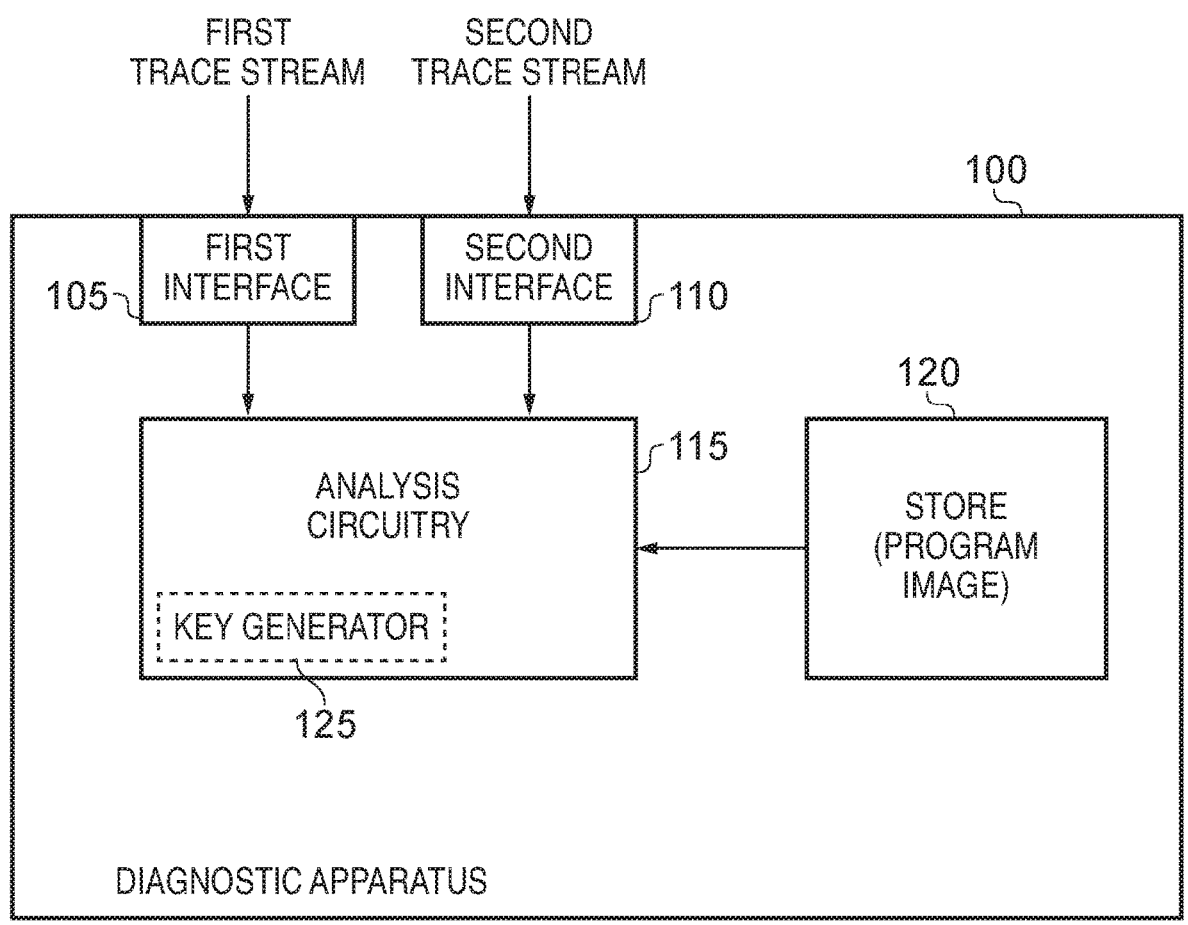
Figure 7:
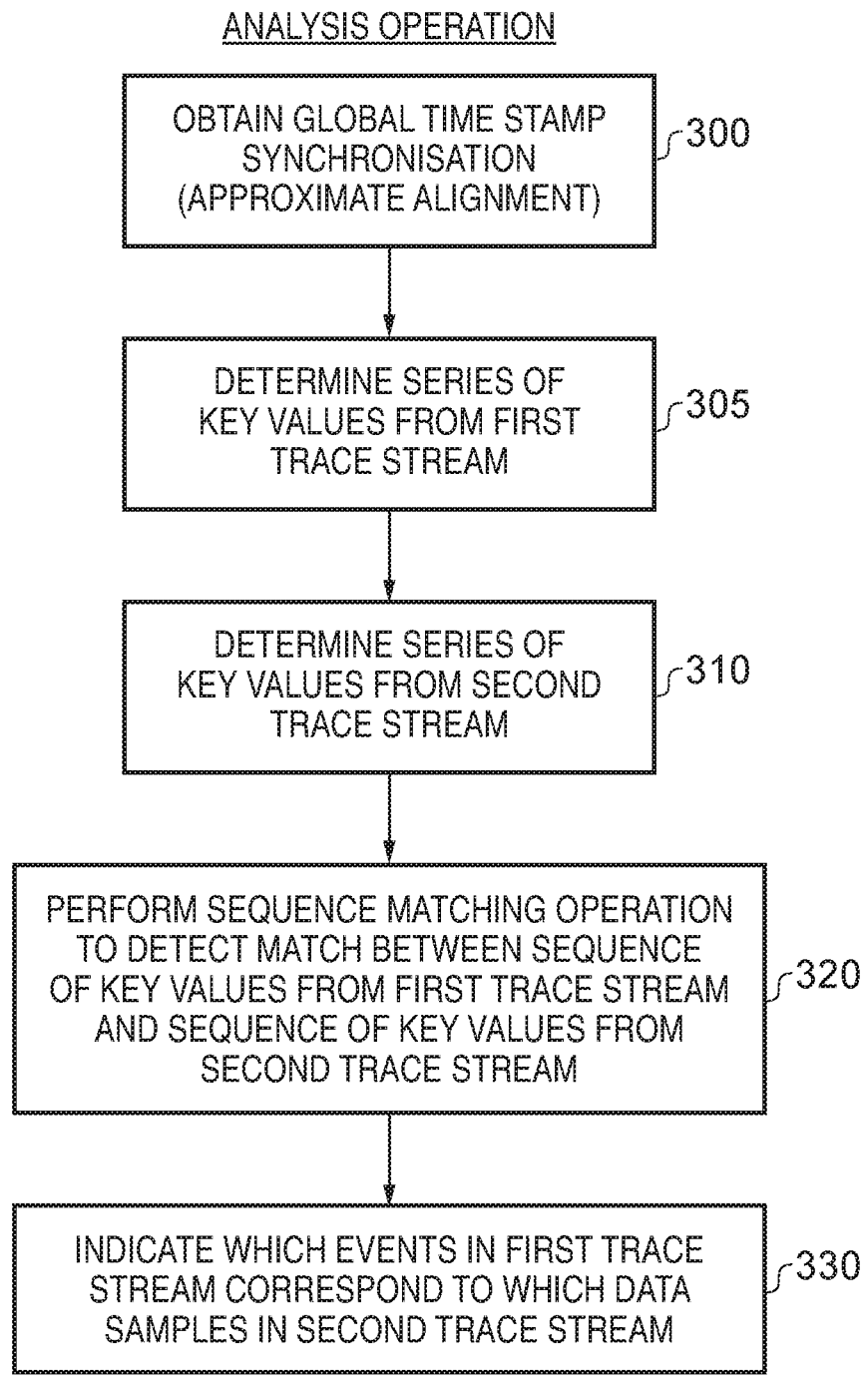

FIGS. 6A and 6B schematically illustrate the sequence matching operation that may be performed to detect alignment between corresponding elements in the two trace streams; and FIG. 7 is a flow diagram schematically illustrating the analysis operation performed by the diagnostic apparatus of FIG. 2 in order to determine alignment between trace elements in the first and second trace streams, in accordance with one example.

As mentioned earlier, it is desirable in some instances to be able to align corresponding elements in multiple streams of elements. For instance, considering the example of trace generation, it is possible that multiple separate trace streams may be produced, where within those multiple streams some of the elements in one stream relate to the same activities as captured by corresponding elements in the other stream, and accordingly when analysing the multiple trace streams it is useful to be able to align individual elements in one stream with the corresponding elements in the other stream.

However, it is often the case that at least one of the streams is bandwidth limited. As a result, it may not be possible to tag the elements of interest in both streams with identifiers that are unique in isolation, for example with a high resolution timestamp, or a monotonically increasing sequence number, due to the amount of space that such identifiers would consume.

Accordingly, a more efficient mechanism is desired for seeking to align the elements appearing in multiple streams.

In one example of the present technique, an apparatus is provided that has first generation circuitry used to generate a first stream comprising first elements, and second generation circuitry used to generate a second stream comprising second elements. The first stream may include other elements in addition to instances of the first elements, and similarly the second stream may include other elements in addition to instances of the second elements. However, the first and second elements are of particular interest to the present technique, since there is a correlation between occurrences of the first elements in the first stream and occurrences of the second elements in the second stream. In particular, the first generation circuitry is arranged to insert a first element in the first stream to identify each occurrence of a corresponding second element in the second stream.

Given this fact, it is likely during subsequent analysis of the first and second streams that there will be a desire to match each instance of the first element in the first stream with the corresponding instance of the second element in the second stream, and the techniques described herein provide an efficient mechanism for including sufficient information to enable such an analysis to take place, whilst reducing the bandwidth required to accommodate such additional information.

In particular, in the described techniques key generation circuitry is used to generate, for each instance of the first element to be included within the first stream, an associated key value determined from a set of the key values. However, the set of key values is insufficient to allow unique key values to be generated for each instance of the first element likely to be included within the first stream during a period of interest.

The first generation circuitry is then arranged to indicate within the first stream the associated key value for each instance of the first element. Whilst as noted above an individual key value is insufficient to enable unique identification of any particular instance of the first element within the first stream, and hence by itself cannot enable alignment to be made with a corresponding second element in the second stream, it has been observed that by analysing a sequence of key values associated with a corresponding sequence of instances of the first element within the first stream, for example using known sequence matching techniques, this does enable alignment between a first element in the first stream and its corresponding second element in the second stream.

Accordingly, by such an approach, the amount of information which needs to be included within at least the first stream in order to enable later alignment between elements in the first stream and corresponding elements in the second stream can be significantly reduced, thereby alleviating bandwidth constraints whilst still allowing the exact correspondence between the elements in the first and second streams to be later detected.

The information included within the second stream can take a variety of forms. In one example arrangement, the second stream contains identifier information in association with each second element sufficient to enable determination of the associated key value generated by the key generation circuitry for the corresponding first element. In one example scenario, the identifier information may itself comprise the associated key value, and hence the relevant key values are included directly within both of the streams. This can, for example, be particularly useful where not only the first stream, but also the second stream, is bandwidth limited.

However, alternatively, the apparatus may further comprise counter circuitry to generate a counter value to form the identifier information, and the key generation circuitry is coupled to the counter circuitry in order to generate each key value from a current counter value. Hence, individual counter values may be incorporated within the second stream in association with each instance of the second element, and the keys generated by the key generation circuitry are generated in dependence on current counter values. In such a scenario, when the streams are later analysed, provided the diagnostic circuitry has knowledge of the manner in which the keys were generated by the key generation circuitry from the counter values, the diagnostic circuitry can compute key values from the counter values included within the second stream, and thereby produce a series of key values for the second stream that can then be compared with a series of key values from the first stream in order to determine alignment.

In situations where the inclusion of the counter value is useful to the subsequent diagnostic apparatus for other reasons, but it is desired not to require the diagnostic apparatus to know the operations performed by the key generation circuitry, then the key values can be included in both streams, such that within the second stream the identifier information may comprise both the counter value and the key value.

In example arrangements where the key value is generated from the current counter value, then the key generation circuitry may be arranged in a variety of ways. In one embodiment the key generation circuitry is arranged to apply a hash function to the current counter value in order to generate a corresponding key value. There are a number of suitable hash functions that could be used, one suitable example being a cryptographic hash function.

In one example arrangement the key generation circuitry is a pseudo random number generator such that the sequence of key values within the first stream are pseudo random.

The pseudo random number generator can be arranged such that, over a time period of interest, the chances of a sequence of a particular number of key values having the same sequence of values is relatively unlikely, but there will still be some probability of that scenario occurring, which could reduce the accuracy of the alignment process.

Accordingly, in one example arrangement the key generation circuitry is arranged to generate key values from the set such that a sequence of a specified number 's' of key values repeats only after 'p' key values have been generated, where p>s. Hence, pseudo random number generation techniques can still be used if desired, but by appropriate arrangement of the key generation circuitry a guarantee can be placed on the number of key values that will be generated before any repetition of a sequence of values for a given sequence size s will be observed (referred to herein as a guaranteed periodicity). By suitable arrangement of the key generation circuitry, the value of p can be arranged to be significantly larger than the value of s, effectively meaning that over a time period of interest it can be guaranteed that when reviewing a particular number s of key values, the particular sequence of values observed will not repeat for any other sequence of s key values within that period.

In one embodiment, the relationship between p and s is given by the equation $$p=b^s-1$$

where b is the number of key values in the set.

Hence, purely by way of example, if there are three key values in the set (for example, the values 1, 2 or 3), and a sequence of 3 key values is considered, then it can be ensured that any given sequence of 3 key values occurs once every 26 issued key values from the key generation circuitry.

Hence, for a period of time of interest for the alignment process, if at least s key values are observed within the first stream, and no more than p values are observed, it will be guaranteed that there will be sufficient information to enable an alignment to be made between first elements in the first stream and corresponding second elements in the second stream.

There are a number of forms of key generation circuitry that can produce a series of key values having the above properties, and in particular with a known periodicity for any particular given sequence of values. In one example arrangement the key generation circuitry comprises a linear feedback shift register (LFSR). In particular, in one arrangement, a maximum-length LFSR can be used that produces a repeating key sequence of length $b^s-1$, such that any given sequence of length s occurs only once in a sequence of length $b^s-1$.

To make efficient use of the above described techniques, it is desirable to be able to identify a coarse alignment between the first and second streams, so that the above described alignment techniques can then be applied to the series of key values observed for both streams following that coarse alignment, in order to ensure exact alignment between a first element in the first stream and its corresponding second element in the second stream. In one example arrangement this is achieved by both the first generation circuitry and the second generation circuitry being arranged to periodically issue a synchronisation value within the respective first and second streams to enable a coarse alignment of the first and second streams, and analysis of the sequence of key values enables exact alignment between a first element in the first stream and its corresponding second element in the second stream following the coarse alignment.

For example, in an implementation where the key generation circuitry implements the guaranteed periodicity feature discussed earlier, it will be the case following the coarse alignment of the first and second streams based on the synchronisation value, that once a sequence of s key values have been observed in the first stream, alignment can be achieved between a first element in the first stream and its corresponding second element in the second stream.

Hence, once coarse alignment can be achieved, then provided at least s key values are observed within the first stream, and no more than p key values are observed, before a next coarse alignment is performed, there will be sufficient information present to ensure an exact alignment can be made between a first element in the first stream and its corresponding second element in the second stream.

The synchronisation value can take a variety of forms, but in one example is a global timestamp value. The frequency with which global timestamp values are included within the trace streams can vary dependent on implementation, and indeed the frequency of global timestamp inclusion may vary between the different streams. Further, in one example arrangement, the frequency with which global timestamp values are included can be varied as desired, to ensure that coarse alignment occurs frequently enough to allow the exact alignment based on the above described sequence matching techniques to be achieved.

The multiple streams of elements may be produced within data processing systems for a variety of reasons. In one example arrangement the apparatus further comprises processing circuitry to execute a sequence of instructions in order to perform data processing operations. In such an example, the first generation circuitry may form first trace generation circuitry to generate, as the first stream, a first trace stream of trace elements, the trace elements in the first trace stream comprising at least the first elements. Similarly, the second generation circuitry may form second trace generation circuitry to generate, as the second stream, a second trace stream of trace elements, the trace elements in the second trace stream comprising at least the second elements.

When two such trace streams are produced, it can be desirable when later analysing the trace streams in order to determine the activities of the processing circuitry, that exact correspondence can be determined between trace elements appearing in the first trace stream, and corresponding trace elements appearing within the second trace stream. In particular, the information provided by the trace elements in the different streams may be different, but they may relate effectively to the same event occurring within the processing circuitry, and accordingly it can be very useful to identify exactly which elements in the first stream relate to the same processing circuit event as the trace elements in the second stream.

In one example, the second trace generation circuitry may comprise sampling circuitry triggered by the processing circuitry to sample data held in one or more storage elements, for example data held in one or more registers of the processing circuitry, with the sampled data then being output as the second element within the second trace stream. In such an example, the sampling circuitry may be arranged to issue a sampling event indication to the first trace generation circuitry when the sampling circuitry is triggered to sample the data, so as to cause the first trace generation circuitry to provide within the first trace stream, as the corresponding first element, a data sampling event. Hence, in such an example, the first stream may include an indication that a data sampling event has occurred, whilst the second stream includes a corresponding trace element providing the data that has been sampled. The above described techniques provide an efficient mechanism to enable those two trace elements in the different trace streams to be matched.

There are a number of ways in which the sampling circuitry may communicate with the first trace generation circuitry. In one example arrangement, the first trace generation circuitry is coupled to an event bus to receive event indications, and the sampling circuitry is arranged to issue the sampling event indication to the first trace generation circuitry over the event bus.

There are a number of ways in which the required key value can be provided to the first trace generation circuitry to be used in association with the sampling event to be identified in the first trace stream. However, in one example arrangement, it is possible to efficiently utilise a plurality of bits of the event bus to provide both an indication of the sampling event and the key value to be used. In particular, in one example the key generation circuitry is associated with the sampling circuitry, and the sampling circuitry is arranged to use a plurality of bits of the event bus to provide an event indication to the first trace generation circuitry that identifies both presence of the sampling event and the key value for that sampling event. Hence, in such an embodiment, once a multi-bit signal is used to indicate the sampling event, then multiple different non-zero variants of that multi-bit signal can be used to specify the presence of the sampling event and the associated key value. This can provide a very efficient implementation.

In one example, the technique also provides a diagnostic apparatus for seeking to determine alignment between elements in the first stream and corresponding elements in the second stream. In particular, the diagnostic apparatus may comprise a first interface for receiving a first stream of elements and a second interface for receiving a second stream of elements, and also may include analysis circuitry to then perform an alignment operation in respect of the first and second streams. The first stream is arranged to contain a first element to identify each occurrence of a corresponding second element in the second stream, and also provides in association with each instance of the first element an associated key value determined from a set of key values. As discussed earlier, the set of key values are insufficient to allow unique key values to be generated for each instance of the first element. The analysis circuitry is then arranged to analyse a sequence of key values associated with a corresponding sequence of instances of the first element in the first stream in order to determine alignment between a first element in the first stream and its corresponding second element in its second stream.

The use of such key values, whereby the required alignment analysis is performed based on sequence matching using multiple of the key values appearing within the stream, provides a very bandwidth efficient mechanism for incorporating the information required for such alignment within the first stream, and if desired the second stream.

As mentioned earlier, the second stream can be arranged to contain identifier information in association with each second element, and the analysis circuitry may use the identifier information to determine the associated key value used for the corresponding first element. In some instances the identifier information may itself comprise the key value, but in an alternative arrangement the identifier information may comprise a counter value generated by counter circuitry, and in that instance the analysis circuitry may be arranged to comprise key generation circuitry to generate an associated key value for each counter value, thereby enabling a series of key values to be produced for the second stream that can then be sequence matched with the corresponding key values included in the first stream.

Particular examples will now be described with reference to the Figures.

Figure 1:
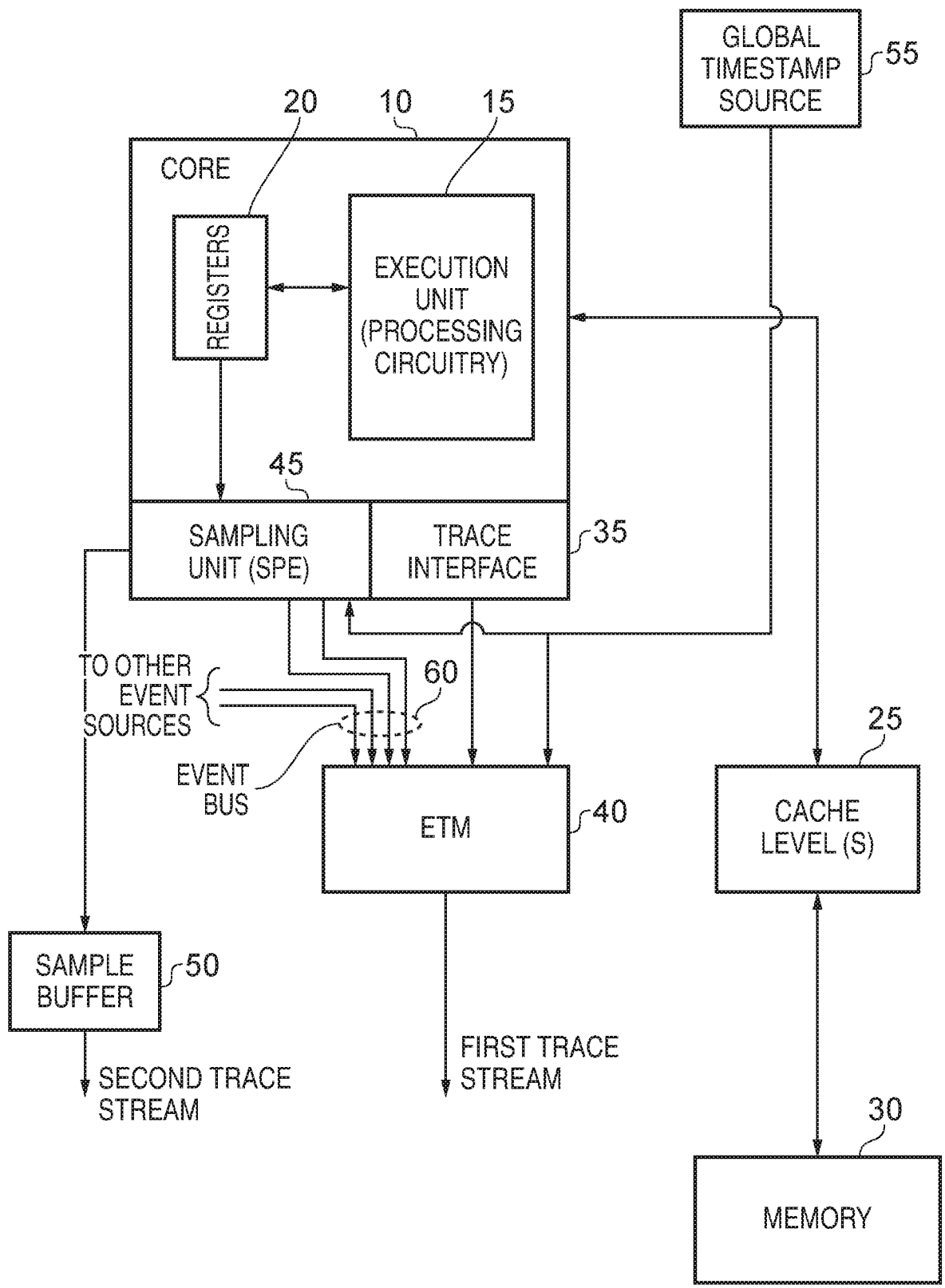

FIG. 1 is a block diagram of a system in accordance with one example arrangement. A data processing apparatus 10 in the form of a processor core such as a central processing unit (CPU) is provided that has an execution unit 15 for executing program instructions in order to perform data processing operations. The execution unit hence takes the form of processing circuitry in order to perform the required data processing operations, and the data utilised by the execution unit when executing those instructions may be accessed in a set of registers 20. Load and store instructions executed by the execution unit 15 can be used to load data values from memory 30 into the registers 20, or to store data values from the registers back to memory 30. As will be appreciated by those skilled in the art, one or more cache levels 25 may be present in the system between the main memory 30 and the core 10, in order to seek to reduce access times to data.

It can be useful to trace the activity of the processor core 10 in order to produce one or more trace streams providing information about the activities performed by the processor core, which can then in due course be analysed off-chip by a suitable diagnostic apparatus. For this purpose, it is known to provide an embedded trace macrocell (ETM) 40 or other suitable trace generation circuitry that can be coupled to the processor core 10 via a trace interface 35. Information about at least a subset of the activities being performed by the processor core can be output from the trace interface 35 to the ETM 40, to cause the ETM to output a first trace stream comprising a series of trace elements that can then be used by a diagnostic apparatus to determine certain details about the activities being performed by the processor core.

Various types of tracing can be performed by the ETM, such as instruction or program flow tracing to provide indications when certain types of instructions are executed. That basic instruction trace information can also be supplemented by other information, for example instruction address information identifying the memory addresses accessed by the processor core to retrieve instructions, and/or data tracing providing indications about the memory addresses accessed in relation to the data values processed by the processor core (optionally the data values themselves may also be captured).

In addition, certain events occurring within the system can be signalled to the ETM 40 via an event bus 60. Information about such events can also then be incorporated within the trace stream produced by the ETM.

As will be understood by those skilled in the art, there are a number of mechanisms that can be used to output the desired information within the trace stream. In one example arrangement, a packet based mechanism is used, such that the trace stream includes a series of packets of information, with the diagnostic apparatus then being able to decode those packets in order to derive the trace information contained therein.

It can also be useful when tracing activities of the processor core to sample the data values held in storage elements such as the registers 20 at certain points in time during execution of the instructions by the execution unit 15. This can be triggered by the processor core as and when required. For example, it may be triggered upon execution of particular instructions, or on execution of every n-th instruction, etc. A sampling unit 45 (for example a statistical profiling extension (SPE) unit) may be provided by the core 10 for such purposes, with the sampling unit being arranged, on receiving a trigger from the processor core 10, to sample the value of one or more registers 20, and to output the sampled data values within a second trace stream, which may be routed via a sample buffer 50.

Whenever the sampling unit samples the data values, it will issue a sampling event indication over the event bus 60 to the ETM 40 so that the ETM 40 can output within its trace stream an indication that a sampling event has occurred.

It will be appreciated that it would be useful to provide a mechanism that enabled a diagnostic apparatus subsequently analysing both of the trace streams to be able to match individual sampling event indications within the ETM's trace stream with the corresponding sampled data within the second trace stream. However, at least the trace stream produced by the ETM 40 is typically very bandwidth constrained. In particular, the ETM may already be outputting a significant volume of trace information. As a result, it is undesirable to incorporate alignment information within the ETM's trace stream that would consume significant space.

As an example, a straightforward option for seeking to align sampling events within the ETM's trace stream with corresponding sampled data in the second trace stream would be to include an identifier that is unique in isolation, for example a high-resolution time stamp, or a monotonically increasing sequence number. If that information is included within both streams, then it is a straightforward process to identify which sampling events correspond to which blocks of sampled data within the second trace stream. However, this consumes a non-negligible amount of space within the ETM's trace stream, which as mentioned earlier is also typically bandwidth constrained, and also puts a requirement on both the ETM 40 and the sampling unit 45 to use the same timestamp source. If the used timer/counter is internal to the core, then the counter value would need to be propagated over the bus connecting the core to the trace unit. It can also be the case that even if the frequency of the relevant events is not high, the trace stream will still be bandwidth limited, and inserting a large event identifier packet can be disruptive, for example causing trace loss. Accordingly, it is desirable to provide a more bandwidth efficient mechanism for providing the required information to enable a diagnostic apparatus to subsequently match individual trace elements in the ETM trace stream with corresponding sampled data in the second trace stream 50. In the illustrated examples, the second trace stream is not as bandwidth constrained as the first trace stream, and accordingly may be able to accommodate unique identifier information. However, in other situations it may also be bandwidth limited, and accordingly any bandwidth-reducing technique applied in the respect of the first trace stream to identify the alignment information may also be desired to be applied in respect of the second trace stream.

In the examples described herein, the reduction in the bandwidth requirement is achieved by arranging for a limited number of possible key values to be provided, and for a key value to be associated with each sampling event indication within the ETM's trace stream. The key values can be derived in a variety of ways. For example, they may be generated via suitable pseudo-random number generation circuitry operating in isolation from any internal counters, in which event the same key values can also be included within the second trace stream. In another example, the key generation circuitry may use the current value of an internal counter as an input and generate the key value in dependence on that input, in which event it is possible that the internal counter value may be output in the second trace stream, with or without the associated key value. If the second trace stream does not include the key values that are inserted into the first trace stream, then the diagnostic apparatus can be provided with sufficient information to enable it to derive the key values from the information that is included within the second trace stream. For example, if the key values are generated in dependence on internal counter values, and the internal counter values are then included within the second trace stream in association with the sampled data, the diagnostic apparatus can be provided with knowledge of the algorithm applied by the key generation circuitry to generate the key values from the internal counter values, and accordingly can re-create the key values from analysis of the internal counter values within the second trace stream.

As a result, the first trace stream will include in association with each sampling event a small key value which in itself is insufficient to facilitate determination of alignment with a corresponding block of sampled data in the second trace stream. However, the second trace stream also either directly includes the key values, or includes information enabling the diagnostic apparatus to determine the key values. Accordingly, at the diagnostic apparatus, the diagnostic apparatus can observe a series of key values within the first stream, and a series of key values either directly present in, or derived from the contents of, the second trace stream. By using sequence matching operations, it is then possible to use the presence of the multiple key values in association with each stream to identify a direct match between individual sampling events in the ETM's trace stream and the corresponding sampled data in the second trace stream.

In one example arrangement, a global timestamp source 55 can be provided within the system, to output a global timestamp to a number of components within the system. Of particular interest to the present technique are the sampling unit 45 and the ETM 40, and both of these components can be arranged to receive the global timestamp information from the source 55. Periodically and/or on occurrence of certain events, both the ETM 40 and the sampling unit 45 may incorporate the global timestamp information within their respective trace streams. It is to be noted that it is not necessarily the case that the same global timestamp value will be output by both the ETM 40 or the sampling unit 45, nor is it necessarily the case that the frequency with which global timestamp values are provided within the two different trace streams will be the same. Nevertheless, through the provision of the global timestamp information, it is possible for the diagnostic apparatus to obtain a coarse alignment between the two trace streams. Once that coarse alignment has been obtained, then the above-mentioned sequence matching techniques, based on comparing a series of key values present within the ETM's trace stream with a series of key values determined from the second trace stream, enables an exact alignment between a sampling event in the trace stream and its corresponding sampled data in the second trace stream.

There are a number of ways in which the key values to be incorporated by the ETM 40 in association with sampling events within the first trace stream can be generated and provided to the ETM. However, in one example arrangement, as illustrated schematically in FIG. 1, if multiple bits of the event bus can be reserved for use by the sampling unit, the sampling unit can incorporate the key generation circuitry, and can use different non-zero values of the multi-bit signal that it transmits to the ETM 40 over the event bus to signal both the presence of a sampling event and the key value associated with that sampling event. This can provided a very efficient mechanism for providing the key value to the ETM for inclusion within the first trace stream.

However, it will be appreciated that there is no necessity to propagate the key value information in this way. For example, in an alternative arrangement one path could be used by the sampling unit to identify to the ETM the presence of a sampling event, and an entirely separate path could be used to provide an associated key value to the ETM 40.

Whilst the first and second trace streams illustrated in FIG. 1 may be provided directly to a diagnostic apparatus, it will often be the case that they are initially stored, and then in due course analysed offline by the diagnostic apparatus. For example, one or both of the first and second trace streams may be stored within the memory 30 for subsequent access by a diagnostic apparatus.

FIG. 2 schematically illustrates a diagnostic apparatus in accordance with one example arrangement. The apparatus has first and second interfaces 105, 110 via which it can retrieve the first and second trace streams. Analysis circuitry 115 is then arranged to analyse the information present with the trace streams. Assuming a packet based mechanism is used for transporting the trace stream, the analysis circuitry may as an initial step perform some decoding of the packets in order to derive the individual pieces of trace information contained within both of the trace streams. The analysis circuitry may then analyse the first trace stream in order to seek to establish the activities performed by the processor core. To assist in this process, the analysis circuitry 115 may have reference to a storage 120, which may for example include a program image of the program executed by the processor core. Using the program image, the analysis circuitry may then for example be able to identify, based on instruction address information contained within the trace stream, the actual instructions executed by the core 10.

The analysis circuitry can also perform an alignment operation in order to utilise sequence matching techniques to detect a match between individual sampling events present within the first trace stream and the corresponding sampled data provided within the second trace stream. As mentioned earlier, if the second trace stream does not directly include the key values that have been used in the first trace stream, then a key generator 125 may be provided within the analysis circuitry to enable the key values to be derived from the identifier information included within the second trace stream in association with each of the blocks of sampled data. As mentioned earlier, the identifier information might for example include an internal counter value, and the key generator 125 will have knowledge of the algorithm used by the key generator associated with the sampling unit in order to generate the original key values from those internal counter values, and accordingly can re-create the key values locally within the analysis circuitry in connection with the second trace stream. As a result, the analysis circuitry can, through a review of the first and second trace streams over a period of time, build up both a series of key values within the first stream and a series of key values associated with the second stream, and then can perform a sequence matching operation to match a sequence of the key values in the first stream with a sequence of the key values in the second stream, to thereby determine an exact alignment between a trace element in the first trace stream and a corresponding trace element in the second trace stream.

As mentioned earlier, there will also be global timestamp information within the two streams that the analysis circuitry can use to establish a coarse alignment between the two streams, and the above-mentioned sequence matching technique is then employed once the coarse alignment has been achieved, in order to determine the exact alignment.

Figure 3A:
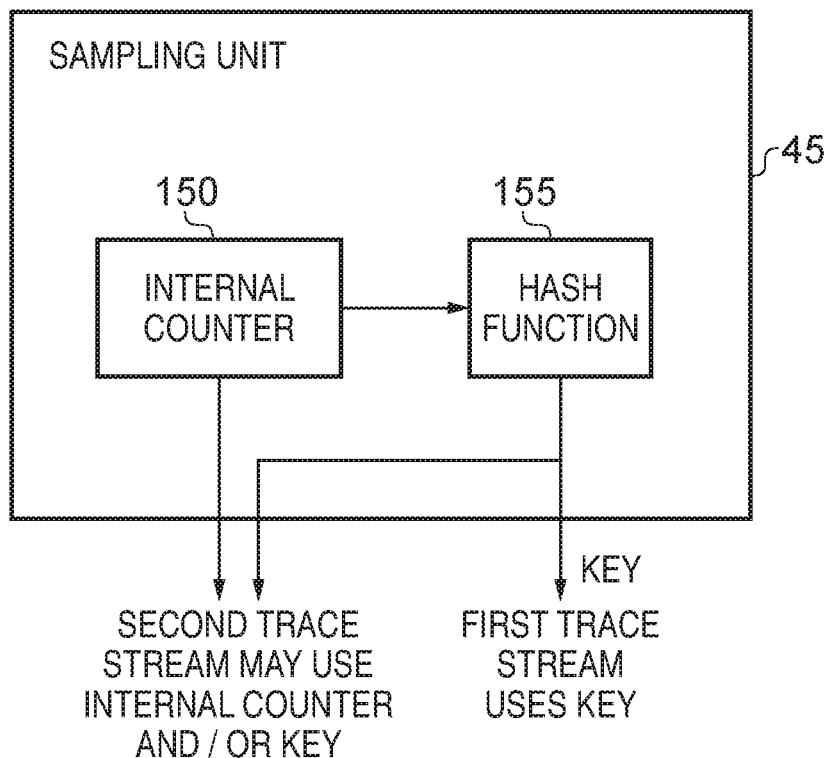

FIG. 3A illustrates a first example of the sampling unit 45 that may be used. In this example it is assumed that the sampling unit 45 maintains an internal counter 150. This may be a sufficiently wide counter to ensure that unique counter values can be associated with events occurring over a period of time of interest. Whilst the second trace stream may have sufficient bandwidth to incorporate such an internal counter value, the first trace stream does not. Instead a key generation circuit can implement the hash function 155 in order to derive a key value from the internal counter, and that key value can then be incorporated within the first trace stream in association with a current event. The hash function can take a variety of forms, but in one embodiment is able to produce a key value from a relatively small set of possible key values in a pseudo-random manner. One example of a suitable hash function would be a cryptographic hash function. If desired, the key value can also be included within the second trace stream instead of, or in addition to, the internal counter value. By including the key value within the second stream, it avoids the need for any key generation functionality 125 to be provided within the analysis circuitry. However, it may be the case that the internal counter value can still provide information that is useful to the analysis circuitry for other purposes, and accordingly may still be included within the second trace stream even if the key value is also included.

Indeed, it is often the case that for each block of sampled data, a number of additional pieces of information are also provided, to provide supplementary information about the processing activity of the core at the time the data was sampled. Three example types of data that may be included in association with the sampled data are a time stamp, a current value of the program counter, and a latency relating to a data access operation, but it will be appreciated that these are merely examples and other forms of information could also be included.

Figure 3B:
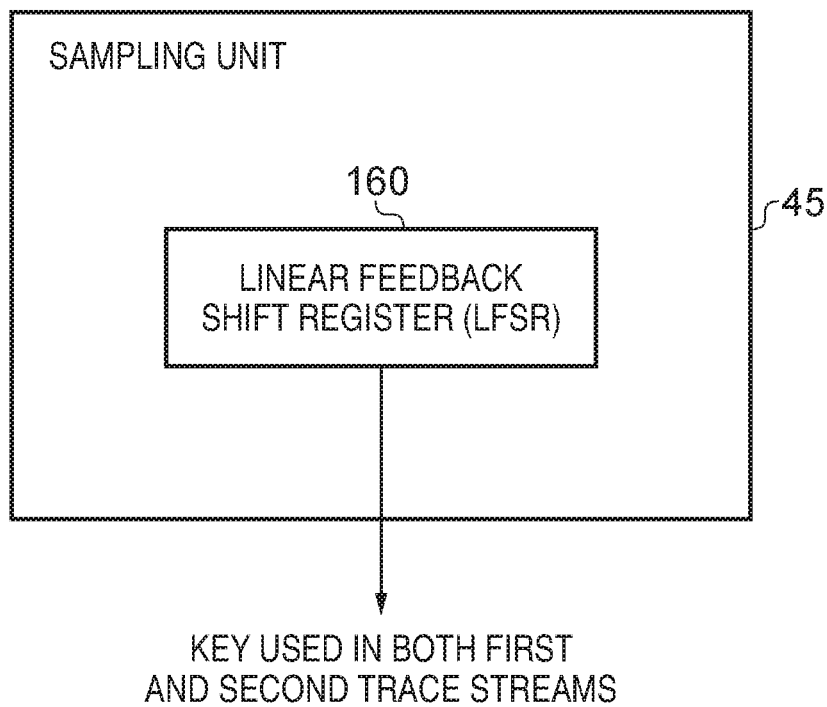

Whilst FIG. 3A illustrates one approach that can be used to generate the key values, there is no need to generate the key value from an internal counter, and instead an entirely separate mechanism can be provided for generating key values which are then included in both the first and second trace streams. One example is illustrated in FIG. 3B, in which the sampling unit 45 includes a linear feedback shift register (LFSR) 160 for generating the key values as and when required. The generated key values are then included within the second trace stream in association with each block of sampled data, and also forwarded to the ETM for inclusion in association with the corresponding sampling event indication. Such an LFSR 160 can again produce key values that are effectively pseudo-random, but can also implement an additional interesting property, namely a guarantee about the number of key values that will be generated before the values of a particular number s of key values will repeat (i.e. a guaranteed periodicity). For example, a maximum-length LFSR can be used that produces a repeating series of keys of length $b^s-1$, such that any given sequence of length s occurs only once in a sequence of length $b^s-1$.

Figures 4A, 4B, 4C:
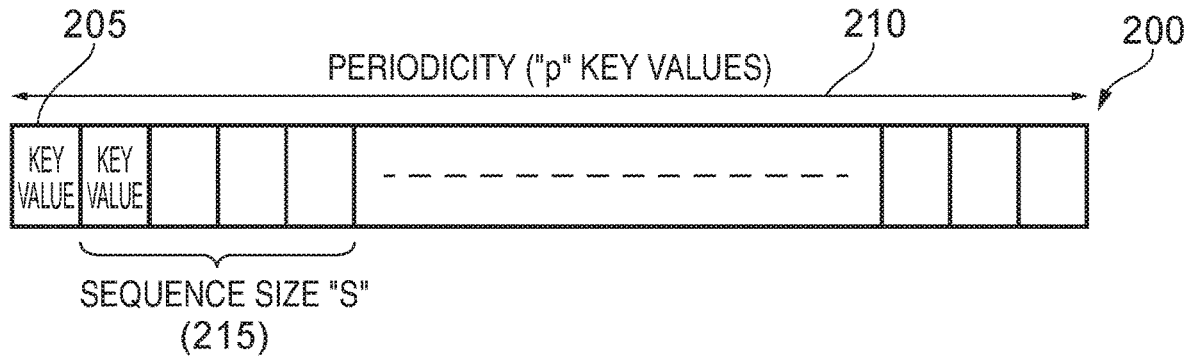
FIGS. 4A to 4C illustrate some properties of the series of key values produced by the LFSR 160 of FIG. 3B in accordance with one example arrangement.

This is illustrated schematically in FIG. 4A where a series 200 of key values is shown having a periodicity p 210. The individual key values 205 are generated by the LFSR 160, but it can be ensured that when a particular sequence size s of key values is considered, the particular sequence of values observed will not repeat within the periodicity period p 210. The periodicity length p will depend on both the number of key values in the sequence s being considered, and the number of different key values that can be generated by the LFSR. Two specific examples are shown in FIGS. 4B and 4C. In the example of FIG. 4B, it is assumed that the LFSR is a binary LFSR, and hence any individual key value can only be zero or one (i.e. b is equal to 2). However, even given the very limited number of different key values, provided a reasonable number of sampling events are likely to be observed between each coarse alignment process based on the global timestamps, then it is possible to get an exact match between an individual element in the first trace stream and the corresponding element in the second trace stream. For example, if it is expected that at least eight instances of the sampling event will occur between subsequent coarse alignment processes, then a relatively long periodicity can be observed, in particular the sequence of key values will not repeat until 255 key samples have been generated. Hence, assuming more than eight instances of the key value are observed and less than 255, then a direct alignment can be obtained.

FIG. 4C illustrates another example where there are three possible key values, i.e. b=3. This provides an interesting use case, as those three values can be signalled by two bits on the event bus. When using such a combination of key values, then purely by way of example, it will be seen that even when only three key values are observed, the periodicity associated with those three key values is 26, i.e. the particular combination of key values will only appear once every 26 key values that are generated. An example 26-bit sequence is also shown in FIG. 4C for completeness.

Hence, in accordance with example 2, provided at least three key values will be observed within the first trace stream between each coarse alignment process, and less than 26 key samples will be observed, then it is known that an exact alignment between the individual elements in the first stream and the corresponding elements in the second stream can be achieved by a sequence matching process performed by the diagnostic apparatus.

Figure 5A:
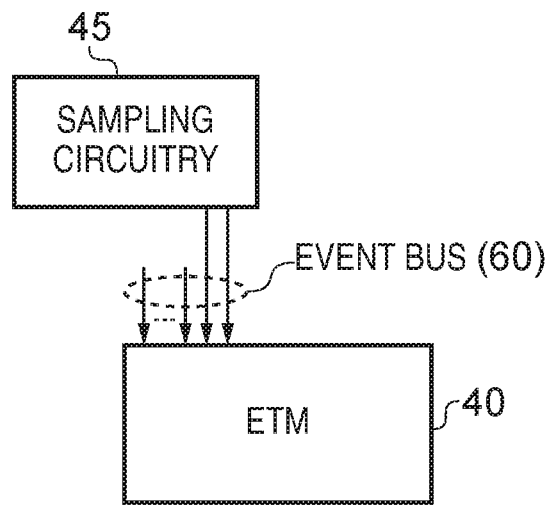

FIG. 5A illustrates how two bits on the event bus 60 could be used to enable the sampling circuitry 45 to indicate to the ETM 40 both the presence of a sampling event, and the key value to be associated with that sampling event. In particular, it can be seen that the three possible non-zero combinations can be used to identify the three different key values 1, 2 or 3, with each of those combination of bits being used to also indicate to the ETM that the sampling event has occurred. This provides a very efficient mechanism for the sampling circuitry to not only indicate to the ETM that the sampling event has occurred, but also to indicate the key value to be used.

FIG. 5B illustrates an alternative arrangement where three bits on the event bus are used for this purpose. It will be seen from FIG. 5B that potentially seven different key values can then be indicated in association with the sampling event. By including more different key values, then either the periodicity can be significantly increased, or the sequence size s required before exact alignment can be guaranteed can be reduced.

As also noted in FIG. 5B, it is possible to provide a variant where the combination "100" is not used. This will provide some configurability within the apparatus, so that either three bits of the event bus could be used so as to enable six key values to be provided, or instead only two bits could be used to enable three key values to be identified.

FIG. 6A schematically illustrates the sequence matching alignment process that may be used in one example arrangement. As mentioned earlier, global timestamp values will be output in both of the trace streams at certain points in time. The global timestamps will not necessarily be issued at the same time within each of the streams, and hence may have slightly different values. Further, even in instances where the same global timestamp value is included within both streams, there is the potential for some skew to occur due for example to the time taken to propagate that global timestamp value to the sampling unit and the ETM, and accordingly even in that instance an exact alignment cannot be achieved by comparing the global timestamp values. Nevertheless, the diagnostic apparatus can achieve an approximate alignment 250 via comparison of global timestamp values within the two steams. Once an approximate alignment has been achieved, then the above mentioned sequence matching processing can be used to achieve an exact alignment. FIG. 6A schematically illustrates this for the situation where the key values have three possible values, namely 1, 2 or 3, and in particular assumes the example 26-bit fixed sequence of FIG. 4C is used. As illustrated in FIG. 6A, it can be seen that using the key values in both streams, it is possible to detect an exact alignment. In this particular instance, it is assumed that the observation of the values 2, 1 and then 3 enables the match to be detected. In practice, the sequence matching algorithm will use all of the key values available in both streams, in order to determine the alignment. Any of a number of algorithms for exact sequence alignment (e.g. Boyer-Moore, exact Smith-Waterman) can be used for this process.

When using the approach discussed earlier with reference to FIGS. 4A to 4C, then it will be appreciated that provided more than s key values are observed between iterative approximate alignment processes, and less than p key values are observed, then it can be guaranteed that a direct alignment will be achievable using the sequence matching approach.

FIG. 6B illustrates an issue that could in principle arise when using the more general purpose pseudo-random series of key values, but which in practice is less likely to cause a problem as more key values are observed. In particular, since the more general purpose pseudo-random key value generators cannot guarantee the periodicity feature discussed with reference to FIG. 4A, there is some probability of repeated sequences occurring between iterative approximate alignments. This is illustrated by the bubble 265 in FIG. 6B, where if only three key values are compared, then for the particular example given there is some ambiguity as to the alignment due to the sequence "1, 2, 3" appearing twice in rapid succession. However, for the particular example illustrated, and as shown by the bubble 270, this ambiguity is removed once four key values are observed, since the sequence of values "1, 2, 3, 1" is not repeated between iterative approximate alignment processes.

FIG. 7 is a flow diagram illustrating the analysis operation that may be performed by the analysis circuitry 115 of the diagnostic apparatus 100 in order to obtain an exact alignment between an element in the first trace stream and the corresponding element in the second trace stream. At step 300, global timestamp synchronisation information is obtained, sufficient to enable an approximate alignment between the two streams to be achieved. Thereafter, at steps 305 and 310 a series of key values from both the first stream and the second stream are determined. At step 320, a sequence matching operation is then applied using the two series of key values in order to detect a match between a sequence of key values in the first trace stream and a sequence of key values within the second trace stream. There are a number of algorithms that could be applied to implement the sequence matching operation. For example, one approach may be to try all possible candidate alignments to determine the alignment that matches the keys, and does not violate any timestamp ordering constraints. For example, in such an approach the approximate alignment information may be incorporated into the sequence matching operation itself. For example, if for a candidate alignment a sequence of key values 1, 2, 3 matches with a corresponding sequence of key values 1, 2, 3 in the other stream, but the approximate alignment obtained from the timestamp information indicates that the key value 1 in one of the streams occurred one side of the approximate alignment, whilst the other occurred the other side of the approximate alignment, it may be determined that there is in fact no match in that instance, and the algorithm will continue to look for a match that does not violate the time stamp ordering.

An alternative algorithm may seek to eliminate the alignments that violate the time ordering first, and then only try the remaining candidate alignments in order to identify the alignment that matches both sequences of key values, thereby directly identifying the correspondence between individual trace elements in the first stream and individual elements in the second stream.

From the above described techniques, it will be appreciated that by the use of a relatively small number of distinct key values, sequence matching techniques can be used to analyse a sequence of key values appearing within one trace stream, and in particular to match them with a corresponding sequence of key values for the other trace stream, in order to obtain an exact match between a trace element in one stream and a corresponding trace element in the other stream. In one example arrangement, the ability to synchronise the two streams is a function of the number of key values seen, the periodicity of the key value generating sequence, and the presence of other correlating information, for example the global timestamp information. It will be appreciated that various adjustments could be made during use to influence the ability of the system to synchronise the stream of events. For example, the frequency with which the global timestamp information is included could be increased, to allow more frequent approximate alignment to be achieved. As another example, the key generation circuitry could be provided with a degree of configurability if desired (e.g. at design-integration time, or dynamically), for example to allow different sequences of key values to be generated having different periodicity properties.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
first generation circuitry to generate a first stream comprising first elements;
second generation circuitry to generate a second stream comprising second elements;
the first generation circuitry being arranged to insert a first element in the first stream to identify each occurrence of a corresponding second element in the second stream;
key generation circuitry to generate, for each instance of the first element to be included within the first stream, an associated key value determined from a set of key values, where the set of key values is insufficient to allow unique key values to be generated for each instance of the first element;
wherein the first generation circuitry is arranged to indicate within the first stream the associated key value for each instance of the first element, such that subsequent analysis of a sequence of key values associated with a corresponding sequence of instances of the first element within the first stream enables alignment between a first element in the first stream and its corresponding second element in the second stream;
wherein the key generation circuitry is a pseudo random number generator such that the sequence of key values within the first stream are pseudo random; and
wherein the key generation circuitry is arranged to generate key values from the set such that a sequence of a specified number 's' of key values repeats only after 'p' key values have been generated, where p>s.

2. The apparatus as claimed in claim 1, wherein the second stream contains identifier information in association with each second element sufficient to enable determination of the associated key value generated by the key generation circuitry for the corresponding first element.

3. The apparatus as claimed in claim 2, further comprising counter circuitry to generate a counter value to form the identifier information, and the key generation circuitry is coupled to the counter circuitry in order to generate each key value from a current counter value.

4. The apparatus as claimed in claim 3, wherein the key generation circuitry is arranged to apply a hash function to the current counter value in order to generate a corresponding key value.

5. The apparatus as claimed in claim 2, wherein the identifier information comprises the associated key value.

6. The apparatus as claimed in claim 1, wherein:

$$p=b^s-1$$

where b is the number of key values in the set.

7. The apparatus as claimed in claim 1, wherein the key generation circuitry comprises a linear feedback shift register (LFSR).

8. The apparatus as claimed in claim 1, wherein both the first generation circuitry and the second generation circuitry are arranged to periodically issue a synchronisation value within the respective first and second streams to enable a coarse alignment of the first and second streams, and analysis of the sequence of key values enables exact alignment between a first element in the first stream and its corresponding second element in the second stream following the coarse alignment.

9. The apparatus as claimed in claim 8, wherein:
following the coarse alignment of the first and second streams based on the synchronisation value, then once a sequence of s key values have been observed in the first stream, alignment can be achieved between a first element in the first stream and its corresponding second element in the second stream.

10. The apparatus as claimed in claim 8, wherein the synchronisation value is a global timestamp value.

11. The apparatus as claimed in claim 1, further comprising:
processing circuitry to execute a sequence of instructions in order to perform data processing operations;
wherein:
the first generation circuitry forms first trace generation circuitry to generate, as the first stream, a first trace stream of trace elements, the trace elements in the first trace stream comprising at least the first elements; and
the second generation circuitry forms second trace generation circuitry to generate, as the second stream, a second trace stream of trace elements, the trace elements in the second trace stream comprising at least the second elements.

12. The apparatus as claimed in claim 11, wherein:
the second trace generation circuitry comprises sampling circuitry triggered by the processing circuitry to sample data held in one or more storage elements, and to output the sampled data as the second element within the second trace stream; and
the sampling circuitry is arranged to issue a sampling event indication to the first trace generation circuitry when the sampling circuitry is triggered to sample the data, so as to cause the first trace generation circuitry to provide within the first trace stream, as the corresponding first element, a data sampling event.

13. The apparatus as claimed in claim 12, wherein the first trace generation circuitry is coupled to an event bus to receive event indications, the sampling circuitry being arranged to issue the sampling event indication to the first trace generation circuitry over the event bus.

14. The apparatus as claimed in claim 13, wherein the key generation circuitry is associated with the sampling circuitry, and the sampling circuitry is arranged to use a plurality of bits of the event bus to provide an event indication to the first trace generation circuitry that identifies both presence of the sampling event and the key value for that sampling event.

15. A diagnostic apparatus comprising:
a first interface to receive a first stream of elements;
a second interface to receive a second stream of elements; and
analysis circuitry to perform an alignment operation in respect of the first and second streams;
the first stream containing a first element to identify each occurrence of a corresponding second element in the second stream, and providing in association with each instance of the first element an associated key value determined from a set of key values, where the set of key values is insufficient to allow unique key values to be generated for each instance of the first element and wherein key values to be generated from the set are such that a sequence of a specified number 's' of key values repeats only after 'p' key values have been generated, where p>s; and
wherein the analysis circuitry is arranged to analyse a sequence of key values associated with a corresponding sequence of instances of the first element within the first stream in order to determine alignment between a first element in the first stream and its corresponding second element in the second stream, wherein the sequence of key values within the first stream are pseudorandom.

16. The diagnostic apparatus as claimed in claim 15, wherein the second stream contains identifier information in association with each second element and the analysis circuitry uses the identifier information to determine the associated key value used for the corresponding first element.

17. The diagnostic apparatus as claimed in claim 16, wherein the identifier information comprises a counter value generated by counter circuitry, and the analysis circuitry comprises key generation circuitry to generate an associated key value for each counter value.

18. A method of operating an apparatus to generate multiple streams of elements, comprising:
generating a first stream comprising first elements;
generating a second stream comprising second elements;
during generation of the first stream, inserting a first element in the first stream to identify each occurrence of a corresponding second element in the second stream;
generating, for each instance of the first element to be included within the first stream, an associated key value determined from a set of key values, where the set of key values is insufficient to allow unique key values to be generated for each instance of the first element; and
indicating within the first stream the associated key value for each instance of the first element, such that subsequent analysis of a sequence of key values associated with a corresponding sequence of instances of the first element within the first stream enables alignment between a first element in the first stream and its corresponding second element in the second stream;
wherein the sequence of key values within the first stream are pseudo random; and
wherein key values from the set are generated such that a sequence of a specified number 's' of key values repeats only after 'p' key values have been generated, where p>s.

19. A method of operating a diagnostic apparatus to analyse multiple streams, comprising:
receiving a first stream of elements;
receiving a second stream of elements; and
performing an alignment operation in respect of the first and second streams;
the first stream containing a first element to identify each occurrence of a corresponding second element in the second stream, and providing in association with each instance of the first element an associated key value determined from a set of key values, where the set of key values is insufficient to allow unique key values to be generated for each instance of the first element and wherein key values from the set are generated such that a sequence of a specified number 's' of key values repeats only after 'p' key values have been generated, where p>s; and
during said alignment operation, analysing a sequence of key values associated with a corresponding sequence of instances of the first element within the first stream in order to determine alignment between a first element in the first stream and its corresponding second element in the second stream, wherein the sequence of key values within the first stream are pseudorandom.

* * * * *